United States Patent [19]

Flatman

[11] Patent Number: 4,881,367
[45] Date of Patent: Nov. 21, 1989

[54] GAS TURBINE ENGINE

[75] Inventor: Richard J. Flatman, Derby, England

[73] Assignee: Rolls-Royce PLC, London, England

[21] Appl. No.: 157,942

[22] Filed: Feb. 19, 1988

[30] Foreign Application Priority Data

Apr. 14, 1987 [GB] United Kingdom ............... 8708859

[51] Int. Cl.⁴ .................................................. F02C 3/32
[52] U.S. Cl. ................... 60/39.07; 60/39.092; 55/306; 417/196
[58] Field of Search ............ 60/39.092, 39.07; 415/121 G; 55/306; 137/15.1; 244/53 B; 417/196, 178

[56] References Cited

U.S. PATENT DOCUMENTS

| 3,436,910 | 4/1969 | Haworth | 60/39.092 |
| 4,456,458 | 6/1984 | Gilbertson | 60/39.092 |
| 4,519,423 | 5/1985 | Ho et al. | 417/196 |
| 4,617,028 | 10/1986 | Ray et al. | 60/39.092 |
| 4,702,071 | 10/1987 | Jenkins et al. | 60/39.092 |

FOREIGN PATENT DOCUMENTS

| 211513A | 2/1987 | European Pat. Off. |
| 193930 | 3/1967 | U.S.S.R. ............ 417/196 |
| 2044359 | 10/1980 | United Kingdom |
| 2058929 | 4/1981 | United Kingdom |
| 2095335 | 9/1982 | United Kingdom |
| 2114229 | 8/1983 | United Kingdom |
| 2140090 | 11/1984 | United Kingdom |
| 2185533 | 7/1987 | United Kingdom |

Primary Examiner—Donald E. Stout
Attorney, Agent, or Firm—Cushman, Darby & Cushman

[57] ABSTRACT

The invention relates to turbopropeller gas turbine engines of the type which have a propeller positioned upstream of the gas generator. Intake openings supply air through intake ducts and annular intake duct to the gas generator. A separating duct removes foreign bodies from the air flowing through an outlet. The separating duct has a plurality of ejector nozzles equi-spaced in the wall of the duct. The ejector nozzles induce a flow through the separating duct to draw the foreign bodies through the separating duct. The separating duct allows the passage of large foreign bodies therethrough without damage to the ejector nozzles. The ejector nozzles are supplied with air from a compressor of the gas generator, and this allows control of the flow through the separating duct by a valve.

12 Claims, 2 Drawing Sheets 4,881,367

GAS TURBINE ENGINE

FIELD OF THE INVENTION

The present invention relates to gas turbine engines, particularly turbopropeller gas turbine engines in which the propeller is positioned upstream of the gas generator, and turboshaft gas turbine engines.

BACKGROUND OF THE INVENTION

Turbopropeller or turboshaft gas turbine engines suffer from a loss of power due to erosion of the gas generator compressor by dust, debris, or other foreign bodies. This is due to dust, debris or other foreign bodies lying on the ground or airport runway being entrained into the air entering the gas turbine engine intake duct, or ducts. The erosion is very severe when a turbopropeller gas turbine engine is in the reverse thrust mode, erosion also occurs when there is zero forward speed and zero net thrust.

Turbopropeller or turboshaft gas turbine engines have been protected from foreign bodies by providing separating ducts which remove the foreign bodies. These separating ducts have ejectors driven by hot gases from a turbine to induce a flow in the separating duct, and some have ejectors which extend into the center of the duct to provide complete mixing.

However it is undesirable to use hot gases as it is difficult to control the flow of hot gases to the ejectors, and leakage of hot gases into the intake duct is not desirable. The positioning of the ejector in the center of the separating duct prevents the passage of large foreign bodies through the separating duct, and the ejector can be damaged by the passage of the large foreign bodies through the separating duct.

SUMMARY OF THE INVENTION

The present invention seeks to provide a turbopropeller gas turbine engine which has a propeller positioned upstream of the gas generator or a turboshaft gas turbine engine with a separating duct which has an ejector which overcomes the above problems.

Accordingly the present invention provides a gas turbine engine comprising a gas generator, intake means for supplying air to the gas generator comprising at least one intake opening and associated intake duct, the at least one intake duct having separating means for removing foreign bodies from the air supplied to the gas generator, the separating means comprising a separating duct connected to said intake duct for receiving the foreign bodies, ejector means to produce a fluid flow through the separating duct for drawing foreign bodies through the separating duct, the gas generator comprising a compressor supplying air to the ejector means to produce a fluid flow through the separating duct, outlet means for discharging the foreign bodies from the separating duct, the ejector means comprising a plurality of equi-spaced ejector nozzles arranged circumferentially in the wall of the separating duct.

The separating duct may comprise a mixing duct, a transition duct and an outlet duct.

The mixing duct may be tubular, and the outlet duct may be of rectangular cross-section.

The mixing duct may have a length to diameter ratio of between two and five.

The mixing duct may have a length to diameter ratio of 2½.

The outlet duct may have a movable wall to vary the area of the outlet means.

The movable wall may have a rectangular shape.

The intake means may comprise two intake openings and two intake ducts arranged diammetrically opposite to each other.

Both intake means may have separating ducts.

The compressor may be an axial flow compressor.

A control valve may control the flow of air from the compressor to the ejector nozzles.

There may be six equi-circumferentially spaced ejector nozzles, and the ejector nozzles may be convergent.

The gas turbine engine may be a turbopropeller gas turbine engine comprising at least one propeller, the at least one propeller being positioned upstream of the gas generator, the intake means being positioned downstream of the at least one propeller.

The at least one propeller may be positioned coaxially with the gas generator.

The at least one propeller may be driven by the gas generator via shaft means and gear means.

The present invention will be more fully described by way of example with reference to the accompanying drawings, in which FIG. 1 is a partially cut away view of a turbopropeller gas turbine engine having separating means according to the present invention.

DETAILED DESCRIPTION OF THE PREFERRED EXEMPLARY EMBODIMENT

Figure 1:
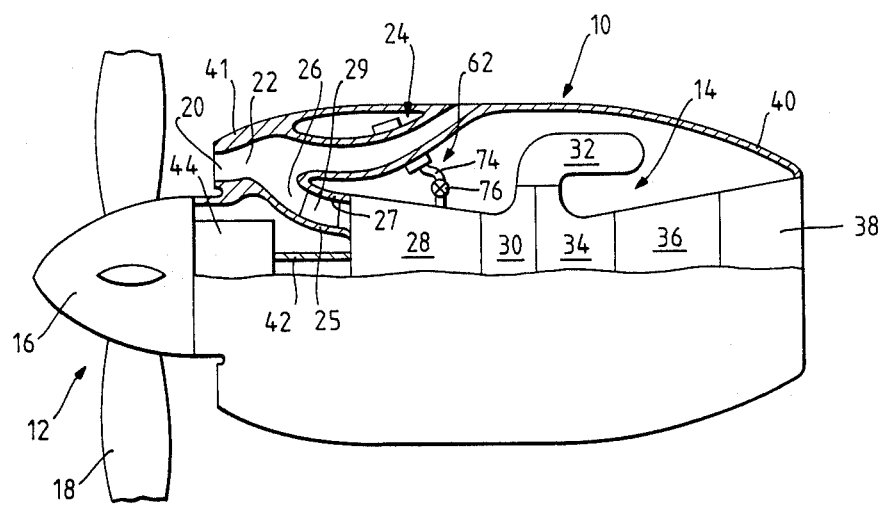

A turbopropeller gas turbine engine 10 according to the present invention is shown in FIG. 1 and comprises a propeller 12 and a gas generator 14.

The propeller 12 comprises a hub 16 which carries a plurality of equi-circumferentially spaced propeller blades 18, the propeller blades 18 being rotatably mounted on the hub 16 so that the pitch of the propeller blades can be varied.

The gas generator 14 comprises in flow series an axial flow compressor 28, a centrifugal flow compressor 30, a combustion system 32, axial flow turbines 34 and 36, and an exhaust nozzle 38. The axial flow turbine 34 is drivingly connected to the compressor 30 via a shaft (not shown), and the axial flow turbine 36 is drivingly connected to the compressor 28 via a shaft 42 (shown partially). The gas generator 14 operates quite conventionally and will not be discussed further.

The propeller 12 is positioned coaxially with and upstream of the gas generator 14. The shaft 42 is drivingly connected to the propeller 12 via a gear assembly 44.

The gas generator 14 is enclosed by a gas generator casing 40. The gas generator casing has two intake openings 20 positioned downstream of the propeller 12. The two intake openings 20 are equi-circumferentially spaced i.e diametrically opposite each other to form a so called bifurcated intake. An intake duct 22 leads axially from each of the intake openings 20 to an annular duct 26 extending extends radially inwardly and in a downstream direction to supply air into the gas generator 14. The annular duct 26 is defined by an annular inner wall 25 and an annular outer wall 27. The annular inner wall 25 encloses the shaft 42 and gear assembly 44. The upstream end of the annular inner wall 25 is secured to the upstream end of the gas generator casing 40, and the annular inner wall 25 is secured to the annular outer wall 27 by a number of radially extending aerodynamically shaped struts 29. The annular outer wall 27 is also secured to the gas generator casing 40. The intake ducts 22 are defined at their radially outer extremity by aerodynamically shaped casings 41 which are secured to and which blend into the gas generator casing 40.

Figure 2:
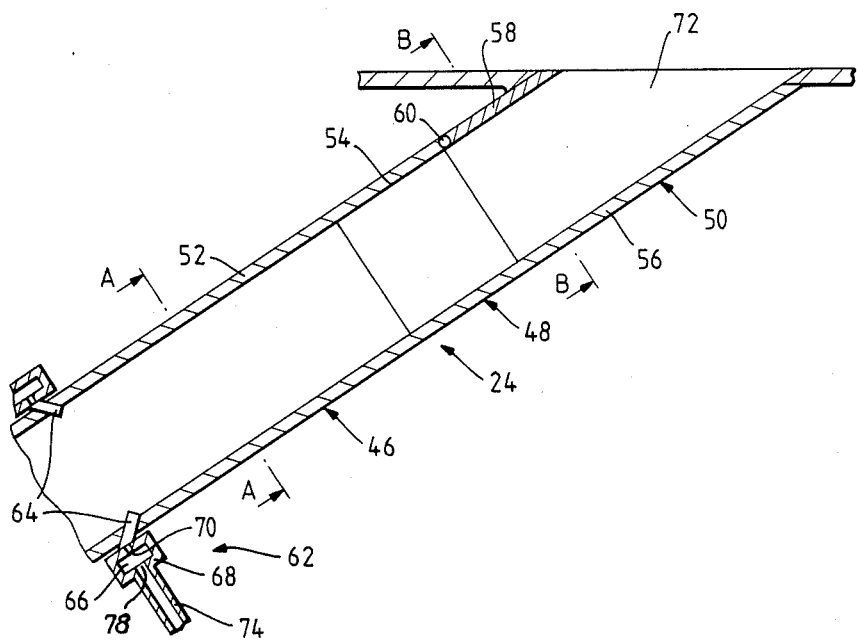
FIG. 2 is an enlarged sectional view of the separating means shown in FIG. 1.
Figure 3:
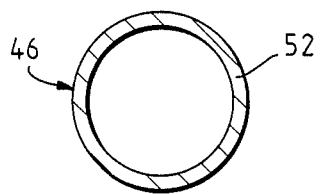
FIG. 3 is a section on the line A—A in FIG. 2.
Figure 4:
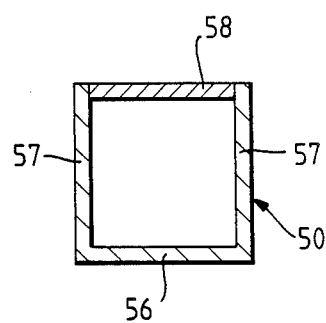
FIG. 4 is a section on the line B—B in FIG. 2.

Each of the intake ducts 22 has a separating duct 24 which is connected to the intake duct 22 and which removes foreign bodies in the air flowing to the gas generator 14. The annular duct 26 is configured with sufficient curvature to separate out large foreign bodies, such as birds, but also dust, debris, erosive particles and other foreign bodies. The separating duct 24 is shown in FIGS. 2,3 and 4 and comprises in flow series a mixing duct 46, a transition duct 48 and an outlet duct 50. The mixing duct 46 is defined by a tubular wall 52, and the mixing duct has a circular cross section. The outlet duct 50 has a rectangular cross section and is defined by spaced side walls 57, a wall 56 extending between and fixed to the side walls 57 and a moveable wall 58 which is pivotally mounted 60 at its upstream end so as to vary the area of the downstream outlet end 72 of the outlet duct 50. The transition duct 48 is defined by a wall 54 which forms a transition from the circular cross section of the mixing duct to the rectangular cross section of the outlet duct.

An ejector assembly 62 comprises a plurality, six in this example, of equi-circumferentially spaced ejector nozzles 64, which are arranged in the tubular wall 52 of the mixing duct 46. The ejector nozzles 64 are positioned at the upstream end of the mixing duct 46, and are arranged to supply a fluid in a downstream direction into the mixing duct to produce a flow through the separating duct 24. The ejector nozzles 64 are preferably of the convergent type, although any suitable type of ejector nozzle may be used. The ejector nozzles 64 eject the air at an angle of substantially 15° to the wall. The ejector nozzles 64 are supplied with a fluid from an annular chamber 66 which is positioned coaxially around the mixing duct. The annular chamber 66 is defined by a hollow annular member 68. The annular member 68 has a plurality of apertures 70 on its inner surface to supply fluid to the ejector nozzles 64. The annular member 68 has an aperture 78 through which fluid flows from a supply pipe 74, the pipe being secured to the annular member 68 at one end and to the compressor 28 at the opposite end. The pipe 74 bleeds off fluid, air, from the compressor for the ejector nozzles to produce a flow through the separating duct. The pipe 74 is provided with a valve 76 which controls the supply of air to the ejector nozzles. The valve 76 is controlled by a control lever operated by a pilot in an associated aircraft. The control lever may be the beta control lever, the power lever, of the aircraft.

The mixing duct is dimensioned so that its length to diameter ratio is between 0.5 and 7, but for optimum performance the length to diameter ratio is between 2 and 5, and is preferably 2.5. The preferred ratio achieves satisfactory mixing of the fluid injected from the ejector nozzles and the air flowing into the separating duct from the intake ducts within the mixing duct length. The mixing duct is also dimensioned so as to allow the passage of a 1.136Kg=2½lb bird therethrough, and this requires a minimum diameter of 11.43cm=4.5 inches.

The moveable wall 58 is to allow for reduction of flow through the separating duct at cruise.

In operation, at take off or during flight, the propeller slip stream and the intake ram recovery will produce an air flow through the separating duct 24 and out of the outlet 72. This air flow will take the foreign particles through the separating duct, away from the annular intake 26 and the gas generator 14.

However, during reverse thrust or zero thrust operation, an air flow through the separating duct 24 has to be encouraged by the ejector nozzles in order to draw the foreign particles into the separating duct, away from the annular intake and the gas generator. Compressed air is bled from the compressor of the gas generator and is supplied to the ejector nozzles to induce a fluid flow through the separating duct. The compressor air is relatively cool, about 200° C., and it is possible to switch the supply of compressor air off, by valve 76, when it is not necessary to induce a flow through the separating duct. The total amount of air bled from the compressor is only of the order of 5% of the airflow through the compressor, and this can be tolerated by the gas generator.

The valve 76 will be opened when the power level is moved to the reverse thrust setting, during ground idle and could be open when the aircraft is taxiing in forward thrust range.

The use of a compressor to supply fluid to the ejector nozzles has two advantages. Firstly it enables the use of a valve to control the fluid supplied to the ejector nozzles, whereas, if a turbine was used, the hot gases would not permit the use of a valve. Secondly, if there is failure of the duct supplying the ejector nozzles, only relatively cool air will flow into the engine cowl and be supplied to an associated aircraft cabin, as opposed to relatively hot gases being supplied to the aircraft cabin which is undesirable.

The moveable wall 58 is used to vary the area of the outlet duct 50 and is used to control the flow the separating duct and to reduce drag. At cruise condition the moveable wall 58 reduces the area of the outlet duct because there is a reduction in flow through the separating duct.

A main feature of the invention is the use of the plurality of ejector nozzles arranged circumferentially in the wall of the mixing duct. This enables a bird or other large foreign object to pass unhindered through the separating duct, and little or no damage will be caused to the ejector nozzles. Another advantage is that the use of an annular ejector formed in the mixing duct wall would have very small dimensions, 0.635mm=25 thousandths of an inch wide, and would tend to become blocked by debris or hail etc. and it would be difficult to manufacture accurately to maintain a uniform width.

The invention is applicable to turbopropeller or turboshaft gas turbine engines which have intakes other than the bifurcated type, for example it is also applicable to a single intake i.e. a chin intake, or more than two intakes.

It is also applicable to turbopropeller gas turbine engines with offset gearboxes as well as the coaxial gearbox.

I claim:

1. A turbopropeller gas turbine engine comprising at least one propeller, a gas generator, and intake means,
    the at least one propeller being positioned upstream of the gas generator, the gas generator comprising a compressor and a gas generator casing, the intake means supplying air to the gas generator being positioned downstream of the at least one propeller, the intake means comprising at least one intake opening formed in the gas generator casing and an associated inlet duct extending from the intake opening to the gas generator, the intake duct including:

separating means for removing foreign bodies from the air supplied to the gas generator, the separating means including a separating duct comprising:

a mixing duct, connected to said intake duct for receiving foreign bodies, the mixing duct having a tubular wall and having a length to diameter ratio of between two and five;

a transition duct connected to said mixing duct, downstream of said mixing duct;

an outlet duct connected to said transition duct, downstream of said transition duct, the outlet duct having an outlet opening and being of rectangular cross-section;

ejector means to produce a fluid flow through the separating duct for drawing foreign bodies through the separating duct, the ejector means comprising a plurality of equi-spaced ejector nozzles arranged circumferentially in the mixing duct wall, the compressor supplying air to the ejector nozzles to produce a fluid flow through the separating duct, conduit means fluidly interconnecting the compressor and the ejector nozzles for supplying air from the compressor to the ejector nozzles, and a control valve controlling the flow of air from the compressor to the ejector nozzles through the conduit means.

2. A gas turbine engine as claimed in claim 1 in which the mixing duct has a length to diameter ratio of 2½.

3. A gas turbine engine as claimed in claim 1 in which the outlet duct has a moveable flap to vary the area of the outlet opening.

4. A gas turbine engine as claimed in claim 3 in which the moveable flap has a rectangular shape.

5. A gas turbine engine as claimed in claim 1 in which the intake means comprises two intake openings and two intake ducts arranged diammetrically opposite each other.

6. A gas turbine engine as claimed in claim 5 in which both intake means have separating ducts.

7. A gas turbine engine as claimed in claim 1 in which the compressor is an axial flow compressor.

8. A gas turbine engine as claimed in claim 1 in which there are six equi-circumferentially spaced ejector nozzles.

9. A gas turbine engine as claimed in claim 1 in which the ejector nozzles are convergent.

10. A gas turbine engine as claimed in claim 1 in which the at least one propeller is positioned coaxially with the gas generator.

11. A gas turbine engine as claimed in claim 1 in which the at least one propeller is driven by the gas generator via shaft means and gear means.

12. A gas turbine engine as claimed in claim 1 wherein the ejector nozzles are arranged circumferentially in the mixing duct wall at angles of 15° relative to the mixing duct wall.

* * * * *